United States Patent
Chambliss et al.

(10) Patent No.: US 10,169,184 B2
(45) Date of Patent: *Jan. 1, 2019

(54) IDENTIFICATION OF STORAGE PERFORMANCE SHORTFALLS

(71) Applicant: INTERNATIONAL BUSINESS MACHINES CORPORATION, Armonk, NY (US)

(72) Inventors: David D. Chambliss, Morgan Hill, CA (US); Itzhack Goldberg, Hadera (IL); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,933

(22) Filed: Oct. 27, 2017

(65) Prior Publication Data
US 2018/0052753 A1 Feb. 22, 2018

Related U.S. Application Data

(63) Continuation of application No. 14/671,188, filed on Mar. 27, 2015, now Pat. No. 9,886,363.

(51) Int. Cl.
*G06F 11/34* (2006.01)
*G06F 11/30* (2006.01)

(52) U.S. Cl.
CPC ...... *G06F 11/3034* (2013.01); *G06F 11/3414* (2013.01); *G06F 11/3476* (2013.01); *G06F 11/3485* (2013.01); *G06F 11/3419* (2013.01)

(58) Field of Classification Search
None
See application file for complete search history.

(56) References Cited

U.S. PATENT DOCUMENTS

| | | | |
|---|---|---|---|
| 7,376,866 | B1 | 5/2008 | Sarma |
| 7,613,597 | B2 | 11/2009 | Vertes |
| 7,865,471 | B1 | 1/2011 | Stagg |
| 8,132,190 | B2 | 3/2012 | Vertes |
| 8,578,340 | B1 | 11/2013 | Daudel et al. |
| 8,683,592 | B1 | 3/2014 | Dotan et al. |
| 9,886,363 | B2 * | 2/2018 | Chambliss .......... G06F 11/3034 |

(Continued)

OTHER PUBLICATIONS

IBM, List of IBM Patents or Patent Applications Treated as Related, Appendix P, dated Oct. 31, 2017, 2 pages.

(Continued)

*Primary Examiner* — Michael Lebentritt
(74) *Attorney, Agent, or Firm* — Tihon Poltavets

(57) ABSTRACT

A computer-implemented method for determining performance shortfall in a storage system includes recording a log of I/O operations of a storage system, wherein each I/O operation includes associated operational parameters. The method prepares the storage system to perform a replay of a performance shortfall that occurred during a specified time frame. The method performs the replay on the storage system based at least on the log of I/O operations and the I/O operations' associated operational parameters for the specified time frame. The method identifies a cause for the performance shortfall during the specified time frame based at least on the difference between I/O performance measures of the replay and I/O performance measures for the specified time frame.

6 Claims, 3 Drawing Sheets

(56) References Cited

U.S. PATENT DOCUMENTS

| | | |
|---|---|---|
| 2005/0025390 A1 | 2/2005 | Tsujii |
| 2006/0248091 A1 | 11/2006 | Yamamoto et al. |
| 2008/0046696 A1 | 2/2008 | Vertes |
| 2009/0119549 A1 | 5/2009 | Vertes |
| 2010/0162050 A1 | 6/2010 | Cathro |
| 2011/0231452 A1 | 9/2011 | Nakajima et al. |
| 2012/0185430 A1 | 7/2012 | Yao et al. |
| 2013/0120439 A1 | 5/2013 | Harris et al. |
| 2013/0124568 A1 | 5/2013 | Wang |
| 2013/0339931 A1 | 12/2013 | Rode |
| 2016/0011955 A1 | 1/2016 | Tsai et al. |
| 2017/0131911 A1 | 5/2017 | Veeraraghavan et al. |

OTHER PUBLICATIONS

Pending U.S. Appl. No. 14/671,188, filed Mar. 27, 2015, entitled: "Identification of Storage Performance Shortfalls", 31 pages.

Hendryx, A. "Why Your Storage isn't Always to Blame! ZDNet" Jan. 18, 2011. [online] <http://www.zdnet.com/article/why-your-storage-isnt-always-to blame>.

Leung, A. et al., "Using Comprehensive Analysis for Performance Debugging in Distributed Storage Systems," In MSST, vol. 7, pp. 281-286, 2007.

Chambliss, D. et al., Original U.S. Appl. No. 14/321,924, filed Jul. 2, 2014.

\* cited by examiner

IDENTIFICATION OF STORAGE PERFORMANCE SHORTFALLS

BACKGROUND

The present invention relates generally to I/O performance and more particularly to I/O performance shortfalls in storage systems.

Typically, an application operating in a network environment can experience performance issues, where determination of a root cause for the performance issue of the application can include an extensive process. During this process, it is often observed that storage system operation latencies are higher than expected for favorable operating conditions. Higher latencies in storage system operations often result in application performance issues. Storage system operation latency is regarded as a measure of storage system performance and a higher latency can represent, for example, insufficient performance capabilities (e.g., too few disk drives), a configuration error, or a product of insufficient quality. However, operations of high latency can also result from causes outside the storage system.

SUMMARY

Embodiments of the present invention disclose a method, computer program product and computer system for determining performance shortfall in a storage system. A computer-implemented method includes: recording a log of I/O operations of a storage system, wherein each I/O operation includes associated operational parameters; preparing the storage system to perform a replay of a performance shortfall that occurred during a specified time frame; performing the replay on the storage system based at least on the log of I/O operations and the I/O operations' associated operational parameters for the specified time frame; and identifying a cause for the performance shortfall during the specified time frame based at least on the difference between I/O performance measures of the replay and I/O performance measures for the specified time frame.

DETAILED DESCRIPTION

Embodiments in accordance with the present invention allow for the determination of whether a storage system is a source for operational latencies. Recording an I/O stream and associated performance measures allows for the creation of a snap shot of I/O operations during a point in time of the recording. Replaying the recorded I/O stream in an environment isolated from the network allows for the recording of associated performance measures of the isolated storage system. Embodiments in accordance with the present invention compare the original recording of associated performance measures to the replay recording of associated performance measures to determine whether the performance shortfall is due to the storage system or factors outside of the storage system (e.g., the network).

Figure 1:
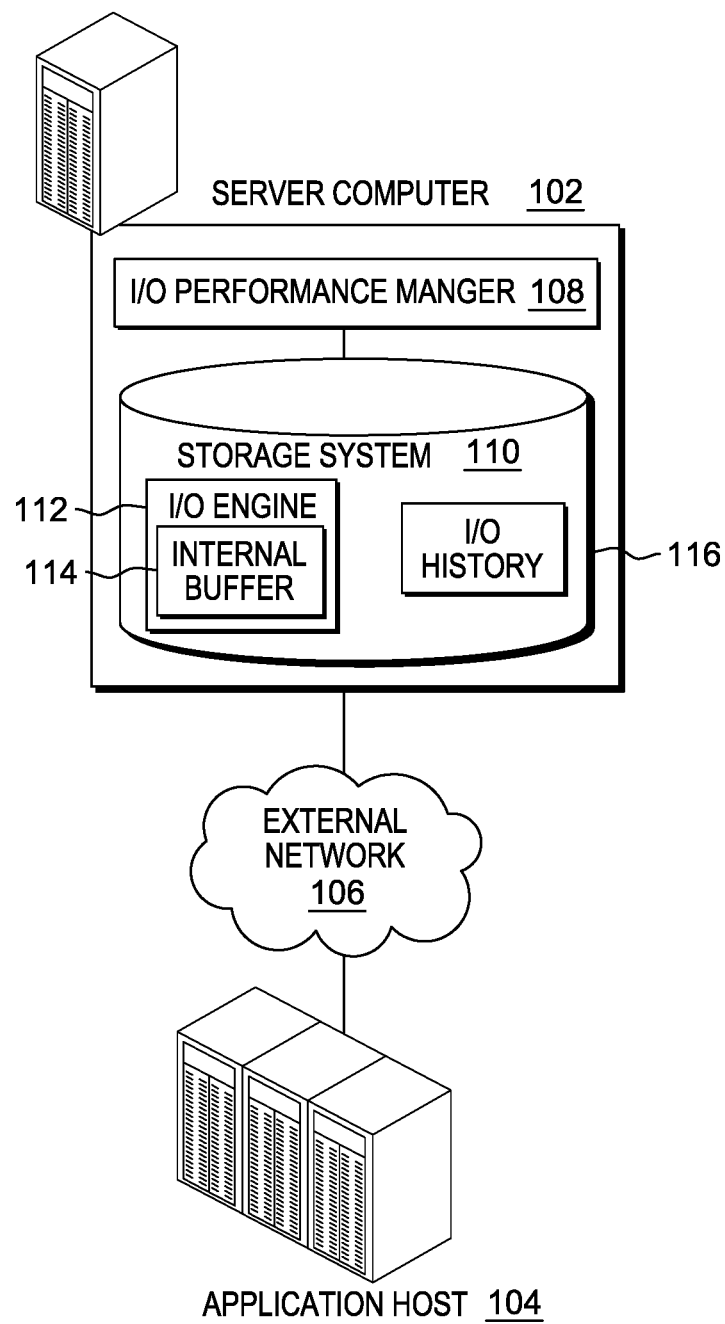
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102 and application host 104 interconnected over external network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through external network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

Application host 104 represents any system that can transfer data to storage system 110 located on server computer 102 via external network 106. Application host 104 may be a desktop computer, a laptop computer, a tablet computer, a specialized computer server, a smartphone, or any other computer system known in the art. In this embodiment, latencies of an operation include a period of time to transfer data between storage system 110 and application host 104 through external network 106. A performance shortfall of application host 104 represents a high latency in the operation of data transfer between storage system 110 and application host 104.

I/O performance manager 108 residing in server computer 102 has the ability to determine if the performance shortfall of application host 104 is due to storage system 110 or due to factors external to the storage system (e.g., external network 106). I/O performance manager 108 can record an I/O log of operations and performance information for storage system 110 and store the I/O log of operations and performance information in I/O history 116. I/O performance manager 108 can monitor the performance of application host 104 by receiving operational information from application host 104 and determining if a performance shortfall (i.e., high latency) has occurred in a specified time frame. I/O performance manager 108 can perform a replay scenario on storage system 110 based on the I/O log for the specified time window, when the performance shortfall occurred. I/O performance manager 108 can compare I/O performance measures of the replay to the I/O performance measures for the specified time frame to determine if the performance shortfall is due to latencies in storage system 110 or due to factors external to storage system 110.

Storage 110 residing in server computer 102 includes I/O engine 112 and I/O history 116. I/O engine 112 handles all I/O operations between storage system 110 and application host 104. Internal buffer 114 of I/O engine 112 records I/O operations as well as any other parameters that I/O performance manager 108 can utilize to perform a replay on storage system 110. Information recorded by internal buffer is stored as I/O history 116, outside the ongoing I/O path between storage system 110 and application host 104. In another embodiment, storage 110 can be located external to server computer 102, hosting I/O performance manager 108 and communicating with server computer 102 via an internal network, not illustrated in FIG. 1.

In general, network 106 can be any combination of connections and protocols that will support communications among server computer 102 and application host 104. Network 106 can include, for example, a local area network (LAN), a wide area network (WAN), such as the internet, a cellular network, or any combination of the preceding, and can further include wired, wireless, and/or fiber optic connections. In one embodiment, I/O performance manager 108 can be a web service accessible via network 106 to a user of a separate device, not illustrated in FIG. 1. In another embodiment, I/O performance manager 108 may be operated directly by a user of server computer 102.

Figure 2:
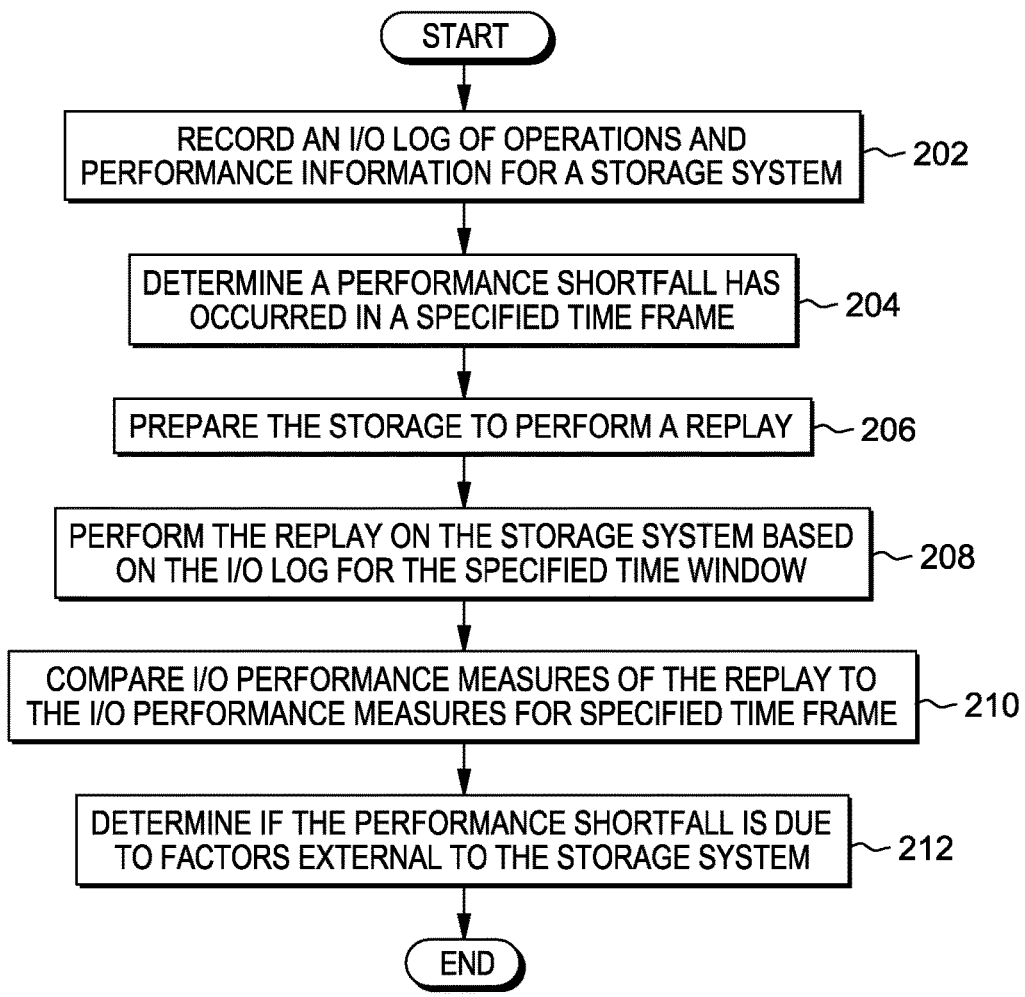
FIG. 2 is a flowchart depicting one embodiment of an I/O performance manager for determining whether a storage system is a source for I/O latencies, in accordance with the present invention.

FIG. 2 is a flowchart depicting one embodiment of an I/O performance manager for determining whether a storage system is a source for I/O latencies, in accordance with the present invention. As depicted, the method includes recording (202) an I/O log of operations and performance information for a storage system, determining (204) a performance shortfall has occurred in a specified time frame, preparing (206) the storage to perform a replay, performing (208) the replay on the storage system based on the I/O log for the specified time window, comparing (210) I/O performance measures of the replay to the I/O performance measures for the specified time frame, and determining (212) if the performance shortfall is due to factors external to the storage system. In one embodiment, the method is conducted by I/O performance manager 108.

The method may commence by recording (202) an I/O log of operations and performance information for a storage system. In this embodiment, I/O performance manager 108 records the I/O log of operations and performance information for storage system 110 by logging I/O operations of storage system 110 along with associated parameters for each I/O operation. The associated parameters allow for I/O performance manager 108 to perform a replay of the particular I/O operation with which the parameters are associated. For example, the parameters can include exact LBA (logical block address) addresses within storage system 110 as well as a range for the read or written a particular I/O operation. The parameters of each I/O operation represent low level information required for I/O performance manager 108 to perform an accurate replay on storage system 110.

I/O performance manager 108 gathers the I/O operations and the associated parameters for each I/O operation and stores the I/O operations and the associated parameters in an allocated portion of storage (i.e., I/O history 116). In one embodiment, an administrative user of I/O performance manager 108 can specify a duration for which an I/O operation and the associated parameters are stored. For example, the administrative user can configure I/O performance manager 108 to store an I/O operation and the associated parameters for a duration of 7 days. In another embodiment, the allocated portion of storage dictates a duration an I/O operation and the associated parameters are stored. For example, an allocation of 64 GB is sufficient to ensure that I/O performance manager 108 can perform a replay at least 7 days following the original occurrence of the I/O operation. I/O performance manager 108 can continuously delete the oldest I/O operation and associated parameters, while storing the current I/O operation and associated parameters. The 64 GB of allocated storage represents a buffer of stored I/O operations and associated parameters.

The method may continue by determining (204) a performance shortfall has occurred in a specific time fame. In this embodiment, I/O performance manager 108 receives a notification from application host 104 that a performance shortfall has been detected due to long response times between application host 104 and storage system 110. I/O performance manager 108 can receive notification of a performance shortfall and tag the associated I/O operations that experienced the longer response time or record markers in the I/O history that indicate where the performance shortfall occurred. I/O performance manager 108 can automatically schedule to perform a replay based on a number of performance shortfall notifications received in a specified time. In another embodiment, an administrative user can observe a performance shortfall and can utilize I/O performance manager 108 to schedule a replay on the storage system for a specified time when the administrative user observed the performance shortfall.

Scheduling a time to perform the replay on storage system 110 involves I/O performance manager 108 identifying a duration of time equivalent to the specified time of the replay, when an amount of existing loads on storage system 110 is low and of low priority. A low amount of existing loads on storage system 110 ensures that I/O performance manager 108 can perform the replay on storage system 110, along with the low amount of existing loads to obtain the most accurate performance measures for the replay. I/O performance manager 108 selects a low priority load as well due to the possibility of the replay decreasing performance offered by storage system 110 to the low priority load. I/O performance manager 108 selecting a low priority load ensures the least amount of impact on the quality of service provided to a customer.

The method may continue by preparing (206) the storage system to perform a replay. In this embodiment, I/O performance manager 108 prepares storage system 110 because replaying write functions without attention to the content puts data integrity at risk, and because reading an address recently written or read will generally execute faster than an initial read of the address due to the content being stored in caches. Preparations by I/O performance manager 108 ensures that a replay of storage system 110 is equivalent to the execution of the original workflow. Preparations by I/O performance manager 108 may include transforming the original workflow as recorded in the I/O history 116 into a transformed sequence of I/O operations.

I/O performance manager 108 instructs storage system 110 to designate processes to perform as the initiators that issue the I/O operations, utilizing transfers over an internal network. In an embodiment, the I/O engine 112 responds to an I/O operation received from such a process by performing the same internal actions that I/O engine 112 performs in response to an equivalent I/O operation received from the application host 104, with the exception that I/O engine 112 does not perform an action to transfer data between storage system 110 and application host 104 through external network 106 and instead performs an action to transfer data with the process over the internal network. The internal network may comprise the bus or buses connecting memory components within the storage system as well as network components such as may constitute external network 106. The paths inside interface nodes are different but create a similar degree of load and congestion on each interface node. I/O performance manager 108 includes various methods for preparation and transformation depending on a type of storage system 110 on which a replay is being performed. I/O performance manager 108 can include writing into a cache only, without de-staging. I/O performance manager 108 can pre-read into a side area all of the data to be rewritten, so that writes can be performed normally during the replay.

I/O performance manager 108 can transform a portion of or all original write operations into read-write pairs to the same addresses, so that each address being written is read prior to performing a write. This transformation allows writes to proceed with no risk to the data being corrupted. Each read of a read-write pair may be performed shortly before the corresponding read, or it may be performed prior to the time of the replay, using methods such a zoning and locking known to those of ordinary skill in the art to ensure that the data remains valid. The performance of the read may be excluded from the performance statistics used to evaluate performance during the replay. I/O performance manager 108 can pre-read all addresses subject to read-then-write, so that the extra read is a solid state drive (SSD) cache hit. I/O performance manager 108 can flush all or part of the cache. I/O performance manager 108 can transform some read addresses to different addresses, so that the replay reads do not get an unfair hit rate.

I/O performance manager 108 can instruct storage system 110 to identify a portion of or all volumes written in the replay input log and allocate a list of addresses for each of the volumes. Storage system 110 creates a writeable snapshot of each written volume for utilization in the replay. I/O performance manager 108 can transform a portion of or all original write operations into snapshot volume write operations, which are ordinary write operations directed to corresponding addresses in the corresponding snapshot volumes. The snapshot volume write operations are to be used during the replay. Additionally, storage system 110 may perform a portion of or all snapshot volume write operations prior to the replay, so that during the replay the snapshot volume write operations are not first-time writes to those addresses, because there may be a performance difference between a first-time write and a subsequent write. Alternatively, storage system 110 converts the snapshots to a state that precludes new partition creation. As a result, there is a reduction on the impact of additional partition creations on the background workload during the replay.

Storage system 110 analyzes the reads in the log to identify which particular reads have performance indicative of cache hits. Storage system 110 can apply a threshold to the total read latency or to a measurement of read completion time excluding data transfer to the host application. Storage system 110 organizes the addresses in the set of reads according to whether the first read of an address in the replay window was a hit or a miss. I/O performance manager 108 performs the preparation to ensure the maximum amount of addresses experience the same characteristics (i.e., hit or miss) during the replay of storage system 110. I/O performance manager 108 can define a transformation rule that applies to addresses in the first-read-is-miss category and replaces the original address with a second address to be used in the replay that has not been previously cached. That transformation includes transforming read-miss read operations into unused-address read operations. A read-miss read operation represents an initial failure of a first read attempt at an address that was subsequently fulfilled with a second read attempt, storing the contents of the read in a cache. By utilizing unused-address read operations, content from the unused address is not present in a cache unlike the content form the read-miss read operation counterpart. It may also transform each subsequent read to the same original address into a replay read to the same second address. Alternatively, I/O performance manager 108 can perform operations that invalidate cache or I/O performance manager 108 can perform reads preceding the replay to ensure that the addresses that should be read hits, are entered in the cache.

Storage system 110 transforms the replay input log into a replay output script containing the I/O operations to replay. The addresses subject to writing in the input log are remapped to addresses in the corresponding snapshot volume. As a result the remapping affects all write operations and all read operations to the same addresses. Storage system 110 also remaps read operations according to any previously produced transformation rule, which alters the addresses of some read operations to ensure they will be cache misses. The replay output script contains one I/O operation for each I/O operation in the replay input log, with equivalent time differences between each I/O operation. Storage system 110 maps read operations in the input to reads in the output and maps write operations, along with the associate volumes and addresses.

The method may continue by performing (208) the replay on the storage system based on the I/O log for the specified time window. In this embodiment, I/O performance manager 108 performs the replay on storage system 110, while storage system 110 is performing other I/O operations outside of the replay. I/O performance manager 108 issues I/O commands listed in the replay output script to storage system 110 adhering to the timing script. I/O performance manager 108 records the I/O performance measures, including the response time for each I/O operation. In another embodiment, I/O performance manager 108 performs the replay on a storage system separate from storage system 110, thus eliminating any other I/O operations occurring outside of the replay.

The method may continue by comparing (210) I/O performance measures of the replay to the I/O performance measures for the specified time frame. I/O performance manager 108 can identify if any I/O operations performed in the replay includes a response time similar to the original I/O operation previously identified as being a performance shortfall. I/O performance manager 108 evaluates the reliability of the replay according to the achieved time spacing between I/O operations and according to which reads were hits and misses.

The method may continue by determining (212) if the performance shortfall is due to factors external to the storage system. In this embodiment, if I/O performance measures of the replay are greater than the I/O performance measures for the specified time frame, I/O performance manager 108 determines the performance shortfall is due to factors external to storage system 110. If I/O performance measures of the replay are equal to or worse than the I/O performance measures for the specified time, I/O performance manager 108 determines the performance shortfall is due to the internal issues of storage system 110. In another embodiment, I/O performance manager 108 can utilize a threshold value to determine if the performance shortfall is due to factors external to storage system 110. For example, I/O performance manager 108 can utilize a threshold value with a ratio of, a response time of an I/O operation during the replay to a response time of the I/O operation during the specified time frame.

Figure 3:
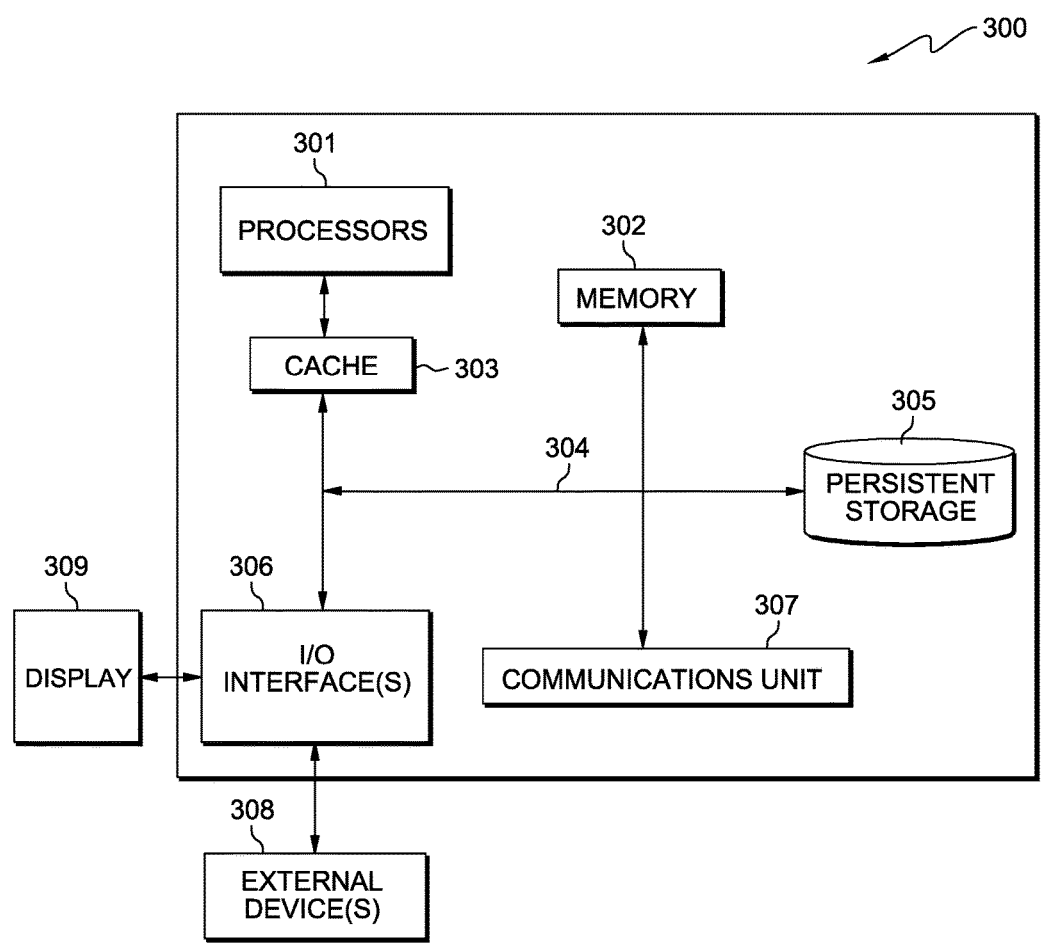
FIG. 3 is a block diagram of components of a computer system, such as the computer server of FIG. 1, in an embodiment in accordance with the present invention.

FIG. 3 depicts computer system 300, where server computer 102 is an example of a system that includes I/O performance manager 108. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining performance shortfall in a storage system, the method comprising:
    determining, by one or more processors, latency in data transfer rates for a first storage system exceeds a threshold during a specified time frame;
    creating, by one or more processors, a snapshot of each write operation performed during the specified time frame based on a log of I/O operations and associated operational parameters, wherein each snapshot identifies a write operation and a set of associated operational parameters;
    performing, by one or more processors, on a second storage system, a portion of the write operations based on the created snapshots prior to performing a replay on the second storage system;
    performing, by one or more processors, the replay on the second storage system based at least on the log of I/O operations and the associated operational parameters for the specified time frame, wherein the replay includes a remaining portion of the write operations based on the created snapshots;
    comparing, by one or more processors, an I/O operation response time on the second storage system to an I/O operation response time on the first storage system for the specified time frame; and
    responsive to determining that the I/O operation response time on the second storage system exceeds the I/O operation response time on the first storage system for the specified time frame, identifying, by one or more processors, the first storage system was not the cause of the performance shortfall.

2. The method of claim 1, further comprising:
    recording, by one or more processors, the log of I/O operations and the associated operational parameters of the first storage system, wherein the associated operational parameters represent information for performing a replay of each I/O operation from the log of I/O operations.

3. The method of claim 1, wherein the first storage system and the second storage system are the same storage system.

4. The method of claim 1, further comprises transforming, by one or more processors, the write operations into read-write operation pairs, wherein for each read-write operation pair an address being written is read prior to performing a write.

5. The method of claim 1, further comprises transforming, by one or more processors, read-miss read operations from the log of I/O operations into unused-address read operations, wherein the replay includes the unused-address read operations.

6. The method of claim 1, wherein the information for performing a replay of each I/O operation from the log of I/O operations includes logic block addresses.

* * * * *